US009967151B2

(12) United States Patent
Hall et al.

(10) Patent No.: US 9,967,151 B2
(45) Date of Patent: May 8, 2018

(54) SECURE REMOTE ACTUATION SYSTEM

(71) Applicant: David R. Hall, Provo, UT (US)

(72) Inventors: David R. Hall, Provo, UT (US); Mark Hall, Springville, UT (US); Craig Boswell, Draper, UT (US)

( * ) Notice: Subject to any disclaimer, the term of this patent is extended or adjusted under 35 U.S.C. 154(b) by 218 days.

(21) Appl. No.: 14/323,618

(22) Filed: Jul. 3, 2014

(65) Prior Publication Data
US 2016/0004230 A1  Jan. 7, 2016

Related U.S. Application Data

(63) Continuation-in-part of application No. 14/323,549, filed on Jul. 3, 2014, now Pat. No. 9,712,335.

(60) Provisional application No. 61/941,130, filed on Feb. 18, 2014, provisional application No. 61/971,978, filed on Mar. 28, 2014, provisional application No. 61/979,935, filed on Apr. 15, 2014, provisional application No. 61/985,399, filed on Apr. 28, 2014, (Continued)

(51) Int. Cl.
*H04L 12/24* (2006.01)
*G05B 15/02* (2006.01)
*G06F 3/0484* (2013.01)
*G08B 25/00* (2006.01)
*G08B 25/10* (2006.01)
*G08C 17/02* (2006.01)
*H04L 12/28* (2006.01)
*H04N 7/18* (2006.01)
*H04L 29/08* (2006.01)
*H04M 1/725* (2006.01)
*H04W 12/08* (2009.01)
*H04W 76/04* (2009.01)
*H04M 11/00* (2006.01)
*H04W 4/02* (2018.01)
*H04W 24/04* (2009.01)

(52) U.S. Cl.
CPC .............. *H04L 41/22* (2013.01); *G05B 15/02* (2013.01); *G06F 3/04847* (2013.01); *G08B 25/008* (2013.01); *G08B 25/10* (2013.01); *G08C 17/02* (2013.01); *H04L 12/2803* (2013.01); *H04L 12/2816* (2013.01); *H04L 41/082* (2013.01); *H04L 41/28* (2013.01); *H04L 67/02* (2013.01); *H04L 67/1097* (2013.01); *H04M 1/72533* (2013.01); *H04M 11/007* (2013.01); *H04N 7/18* (2013.01); *H04W 4/023* (2013.01); *H04W 12/08* (2013.01); *H04W 24/04* (2013.01); *H04W 76/046* (2013.01); *H04W 76/27* (2018.02)

(58) Field of Classification Search
CPC ... G07C 9/00182; H04W 76/27; H04W 12/08
USPC .......................................................... 340/5.2
See application file for complete search history.

(56) References Cited

U.S. PATENT DOCUMENTS 4,614,945 A  9/1986 Brunius et al.
5,576,701 A  11/1996 Heitschel et al.
(Continued)

*Primary Examiner* — Vernal Brown

(57) ABSTRACT

A secure remote actuation system may comprise a remote input receptor and a central signal switch. The remote input receptor may comprise a user interface for receiving user inputs from a user. The central signal switch may comprise acceptable inputs. The central signal switch may further comprise a microcontroller for obtaining and comparing the user inputs to the acceptable inputs. In the present invention, the microcontroller obtains the user inputs from the remote input receptor while the user is using the user interface.

20 Claims, 4 Drawing Sheets

Related U.S. Application Data provisional application No. 61/975,644, filed on Apr. 4, 2014, provisional application No. 61/977,070, filed on Apr. 8, 2014.

(56) References Cited

U.S. PATENT DOCUMENTS

| | | | |
|---|---|---|---|
| 5,872,513 A | 2/1999 | Fitzgibbon et al. | |
| 5,898,397 A | 4/1999 | Marray | |
| 6,400,968 B1* | 6/2002 | White | G08C 17/02 455/127.1 |
| 6,529,230 B1* | 3/2003 | Chong | G08B 25/14 348/14.01 |
| 7,552,467 B2 | 6/2009 | Lindsay | |
| 8,326,424 B2 | 12/2012 | Bange et al. | |
| 8,331,544 B2 | 12/2012 | Kraus et al. | |
| 8,538,341 B2 | 9/2013 | Rousseau | |
| 8,639,339 B2 | 1/2014 | Bange et al. | |
| 2002/0014954 A1* | 2/2002 | Fitzgibbon | G07C 9/00182 340/5.64 |
| 2006/0220834 A1* | 10/2006 | Maeng | G08B 21/24 340/539.1 |
| 2013/0027181 A1 | 1/2013 | King | |
| 2013/0229132 A1* | 9/2013 | Fong | G08C 19/00 315/312 |

* cited by examiner

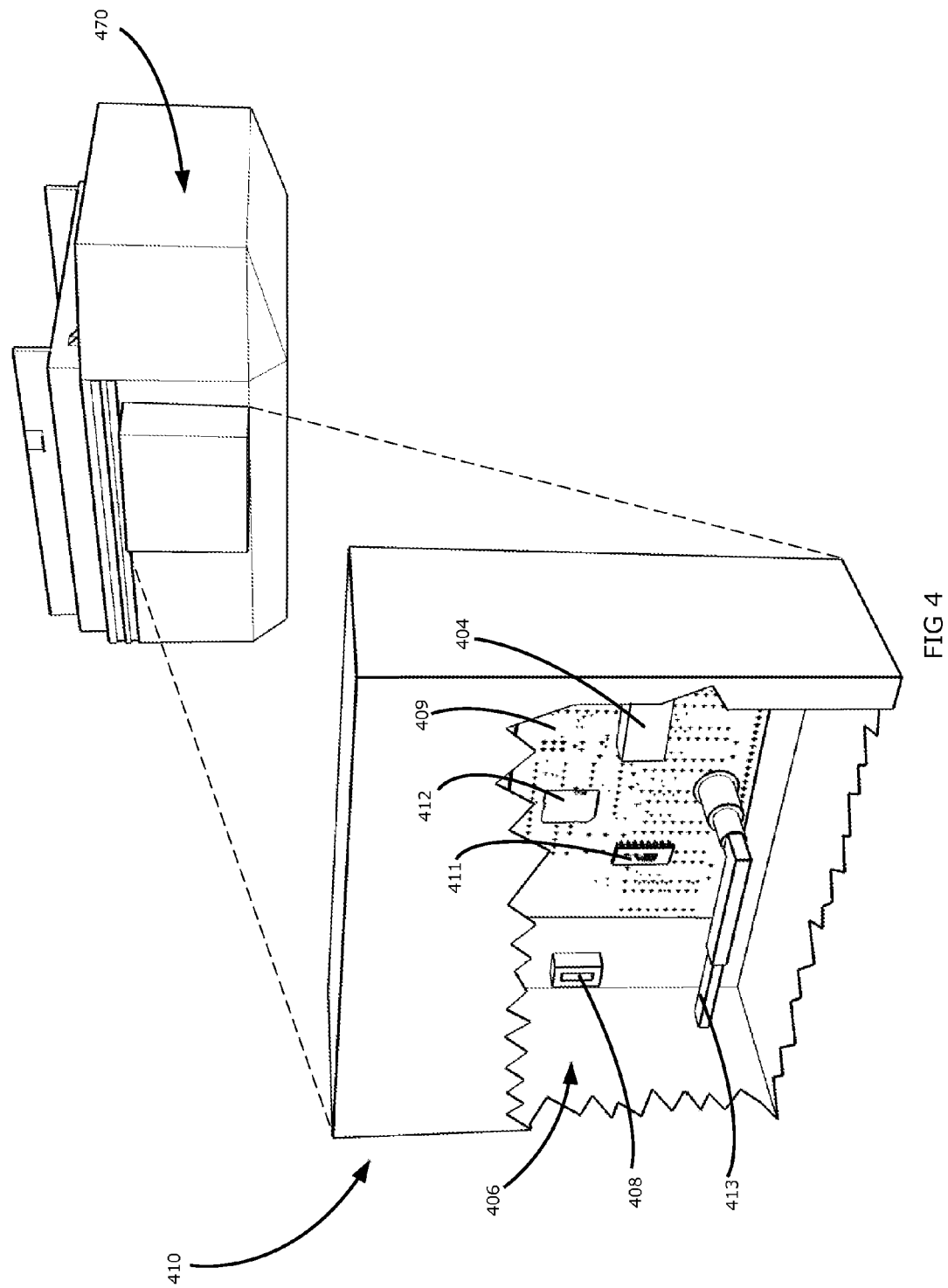

SECURE REMOTE ACTUATION SYSTEM

CROSS REFERENCE TO RELATED APPLICATIONS

This application is a continuation-in-part of U.S. patent Ser. No. 14/323,549 filed on Jul. 3, 2014 and entitled "Secure Remote Actuation System" which is incorporated by reference herein for all that it contains.

BACKGROUND OF THE INVENTION

The present invention relates generally to remote actuation systems comprising devices capable of performing remote operations. Examples of typical remote actuation systems include thermostats, which may control heating and cooling devices from a remote location, and garage door openers, which may provide remote access to secured areas. The remote portions of such devices commonly require a portable power source, such as a battery or photovoltaic cell. It is also typical of such devices to comprise communications means, such as a radio frequency transceiver, to receive and/or relay information.

For example U.S. Pat. No. 8,331,544 to Kraus et al., which is incorporated herein for all that it discloses, describes a system that remotely operates a door lock. The door lock may be powered by a battery and be configured to send and receive radio frequency signals as part of a mesh network. In such a mesh network, each connected device acts as a communication node that can send and receive packets of information to any other device in the network. The door lock may further comprise a memory module where individual user codes are stored and a logic module to compare user codes to input codes at the door to allow access decisions to be made at the door without transmissions.

Such systems typically require continuing communications over a network that may cause rapid consumption of power. Thus, various attempts have been made to conserve power in such systems. For example, U.S. Pat. No. 4,614,945 to Brunius, et al., which is incorporated herein for all that it discloses, describes communicating information between a plurality of instrument monitoring units to a remotely located data collection unit. The monitoring units are radio frequency transponder circuits that are operatively connected to one or more instruments whose parameters are being monitored. The transponders continuously monitor one or more parameters of the instrument(s) with which they are associated. The transponders collect and accumulate parameter information and/or data from their associated instruments and continually listen for a "wake-up" signal from a interrogate receiver/data collection unit.

Despite these advances in the art, improved means of conserving power in remote actuation systems is desirable.

BRIEF SUMMARY OF THE INVENTION

A secure remote actuation system may comprise a remote input receptor and a central signal switch. The remote input receptor may comprise a user interface for receiving user inputs from a user. The central signal switch may comprise one or more acceptable inputs. The central signal switch may further comprise a microcontroller for obtaining and comparing the user inputs to the acceptable inputs. In the present invention, the microcontroller obtains the user inputs from the remote input receptor while the user is using the user interface.

The remote input receptor may also comprise a communication device, such as a radio frequency transceiver, for sending the user inputs to the central signal switch and/or a portable power source, such as a battery or solar panel.

The remote input receptor may be capable of executing a low power function after the user inputs are received from the user, wherein power is cut from unneeded subsystems and reduced in others until reactivated. The remote input receptor may exit the low power function when the user begins to use the user interface again.

The remote input receptor may additionally comprise a surveillance device to detect the user, such as a camera, a microphone, a proximity sensor, or a combination thereof. The remote input receptor may then exit the low power function when the surveillance device detects the user.

The user interface may comprise buttons, a visual display, capacitive sensors, a microphone, a vibration recognition module, a proximity sensor, a fingerprint scanner, a retina scanner, a voice recognition module, or a combination thereof as a means for receiving acceptable inputs from a user.

The remote input receptor and/or the central signal switch may comprise data connection ports. Such data connection ports may be disposed in an interior of the remote input receptor or the central signal switch.

The central signal switch may be connected to a network for sending and receiving acceptable inputs. The network may comprise a software application allowing for an individual to control the acceptable inputs at said central signal switch. For example, the software application may allow the individual to edit, add, or delete the acceptable inputs from the central signal switch, change parameters, change personal settings, alter system firmware, and/or conduct diagnoses.

The central signal switch may further comprise an internal memory unit for storing the acceptable inputs, the user inputs, a history of user inputs, input parameters and/or access parameters. Additionally, the central signal switch may be connected to and capable of controlling various actionable devices, such as a thermostat, a television, an automated window, automated blinds, a ventilation system, a sprinkler system, a lighting element, an indoor positioning system, an access control device, or a combination thereof. The access control device may be an electromechanical locking mechanism or a garage door opener that may secure an enclosed area, room, building, or delivery box.

BRIEF DESCRIPTION OF THE DRAWINGS

FIG. 4 shows a partially cutaway perspective view of an interior of an embodiment of a central signal switch comprising a plurality of components supported by a printed circuit board disposed therein.

DETAILED DESCRIPTION OF THE INVENTION

Figure 1A:
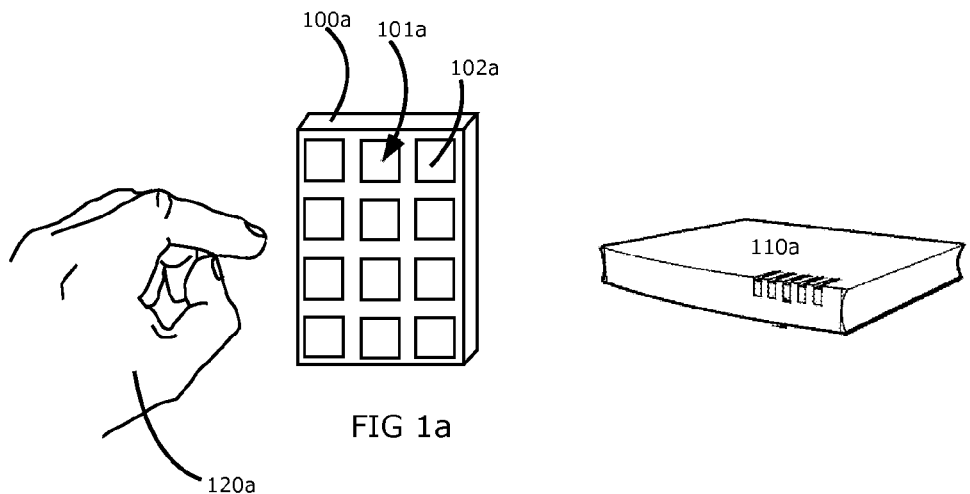
FIGS. 1a and 1b show perspective views of an embodiment of a remote input receptor comprising a user interface, a portion of a user, and a signal switch.

FIG. 1a shows an embodiment of an input receptor 100a, a central signal switch 110a, and a user 120a. The input receptor 100a may comprise a user interface 101a for receiving one or more user inputs from the user 120a. The user interface 101a shown comprises one or more buttons 102a. Such user interfaces may also comprise a visual display, one or more capacitive sensors, a microphone, a vibration recognition module, a proximity sensor, a fingerprint scanner, a retina scanner, a voice recognition module, or other known interfacing means.

Figure 1B:
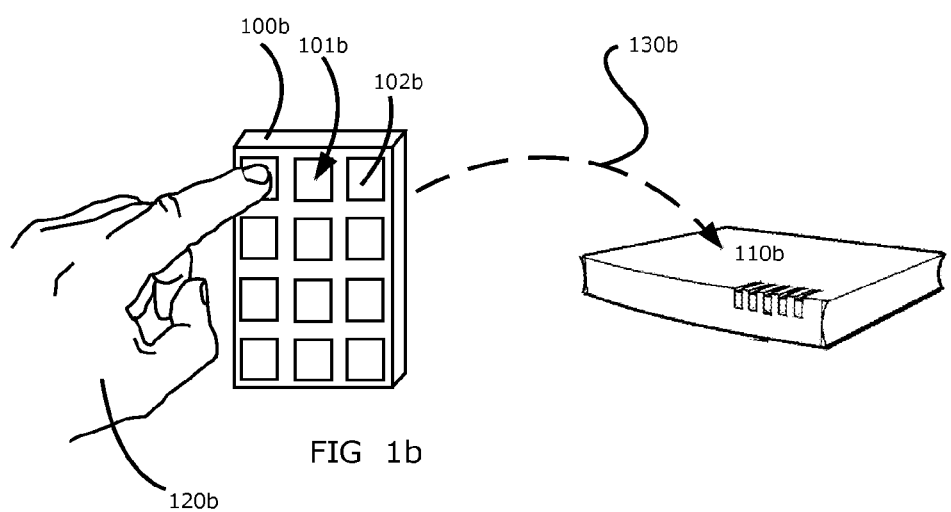

FIG. 1b shows an embodiment of a user 120b entering one or more user inputs into an input receptor 100b by pressing at least one button 102b on a user interface 101b. The one or more user inputs may comprise a keystroke, or any other action receivable by a user interface. As the user 120b supplies each of the one or more user inputs to the user interface 101b, the input receptor 100b may send a signal 130b representing each of the user inputs to a central signal switch 110b. The central signal switch 110b may perform an operation upon receipt of a correct succession of signals or deny an operation upon receipt of an incorrect succession signals.

Figure 2:
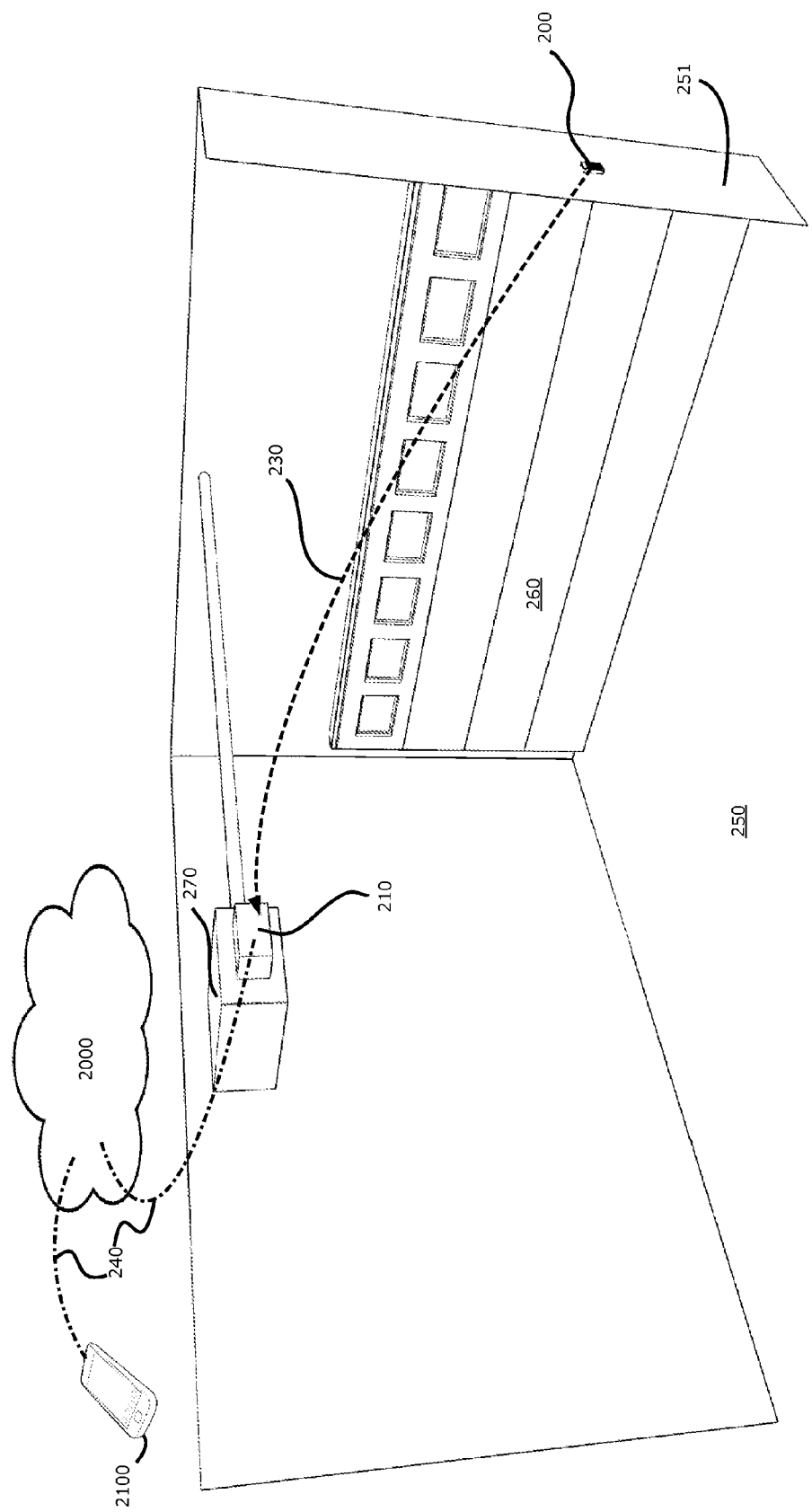
FIG. 2 shows a perspective view of elements of an embodiment of a remote secure access system associated with an enclosed area.

FIG. 2 shows an embodiment of an enclosed area 250 comprising an access barrier 260, such as a door, for blocking or allowing access to the enclosed area 250. The access barrier 260 may comprise an actionable device 270, such as a garage door motor or a door lock, for permitting or denying access to the enclosed area 250. A central signal switch 210 may be connected to the actionable device 270, wherein the central signal switch 210 is capable of actuating the actionable device 270.

An input receptor 200 capable of receiving one or more user inputs may be disposed in, near, or on an exterior 251 of the enclosed area 250. The input receptor 200 may be connected to a central signal switch 210 via a wireless connection capable of sending one or more user inputs 230 to the central signal switch 210. For example, if a user supplies one or more user inputs to the input receptor 200, the input receptor 200 may send the user inputs 230 to the central signal switch 210. If the user inputs 230 are found to be acceptable at the central signal switch 210, such as being one of a list of acceptable inputs, the central signal switch 210 may perform an operation, such as opening or closing the access barrier 260, or engaging or disengaging a door lock.

The central signal switch 210 may also be connected to a network 2000, such as a local area network or the Internet. The central signal switch 210 may receive digital data 240 through the network 2000 from one or more electronic devices 2100 connected to the network 2000. In the embodiment shown, the one or more electronic devices 2100 comprises a smartphone, however, other embodiments may comprise a laptop or desktop computer, a tablet, or other devices capable of communicating over such a network. The one or more electronic devices 2100 may comprise a software application for management of the central signal switch 210 including creating, deleting, or editing one or more acceptable inputs.

Additionally, the software application may be used to create, delete, or edit one or more input parameters. Such input parameters may be used to determine one or more conditions upon which an actuated system may operate. For example, the one or more input parameters may comprise a predetermined user interface interaction sequence, such as a combination of keystrokes supplied by a user, a combination of user inputs, a predetermined sequence of user inputs, a time window during which the central signal switch 210 may receive one or more user inputs, a limitation on which one or more user inputs may be supplied to gain access to the secure area 250, or a limitation on how many times one or more user inputs may be received by the central signal switch 210.

Figure 3B:
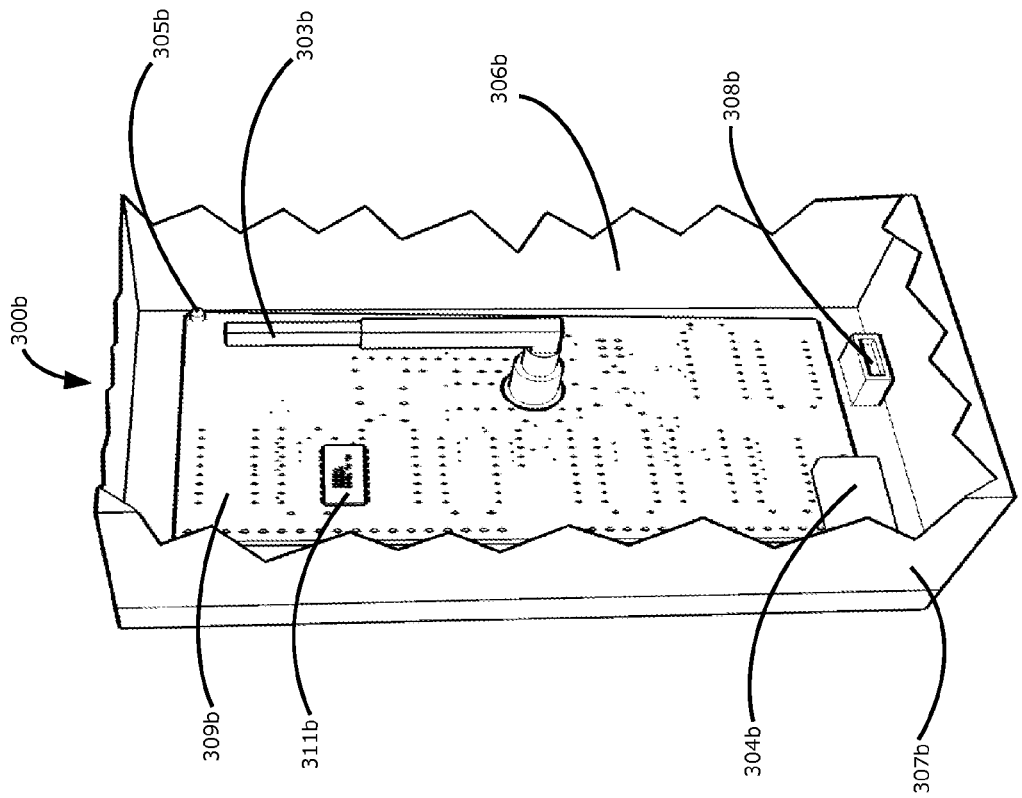
FIG. 3b shows a partially cutaway perspective view of an interior of the remote input receptor shown in FIG. 3a comprising a plurality of components supported by a printed circuit board disposed therein.
Figure 3A:
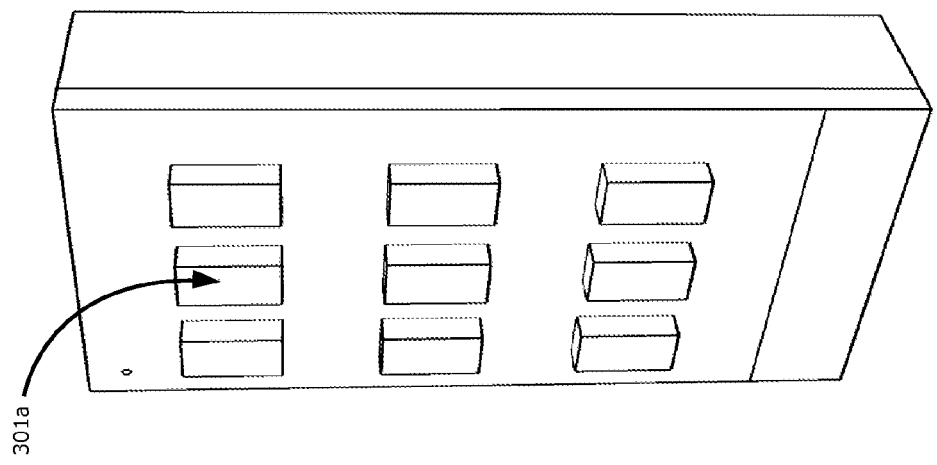
FIG. 3a shows a perspective view of an embodiment of a remote input receptor.

FIGS. 3a and 3b show a perspective view and a partially-cutaway perspective view, respectively, of an embodiment of an input receptor 300b comprising an interface 301a and an interior 306b with a plurality of components supported by a printed circuit board 309b disposed therein.

The printed circuit board 309b may support at least a microcontroller 311b and a communication device 303b. After a user supplies one or more user inputs, the input receptor 300b may transmit the one or more user inputs to a central signal switch (not shown). The central signal switch may store and compare one or more acceptable inputs to the one or more user inputs. If the one or more user inputs match the one or more acceptable inputs, the central signal switch may perform an operation.

The communication device 303b may comprise a radio frequency transceiver or other known communication apparatus. The communication device 303b may communicate at a sub-1 GHz frequency. It may be appreciated by those of ordinary skill in the art that communications at sub-1 GHz frequencies may be more capable of propagating through environmental obstacles, such as a plurality of walls in a residential home, than communications at frequencies higher than 1 GHz. It may therefore be desirable for said communication device 303b to transmit signals at a sub-1 GHz frequency. In some applications, it may be desirable to communicate at a 2.4 GHz or 5.8 GHz frequency to achieve compatibility with other devices, such as those that communicate using ZigBee, Z-Wave, Bluetooth, or Wi-Fi.

The input receptor 300b may be powered by a portable power source 304b, such as one or more galvanic or voltaic batteries, one or more solar cells, or other known means of portable power. The input receptor 300b may execute a low power function after a user has submitted a user input to the user interface 301a. Such a low power function may be executed for a predetermined amount of time or until a user starts to use the user interface 301a again. When the low power function is executed, the input receptor 300b may cut power from unneeded subsystems and reduce power in others until reactivated. This low power function, combined with not requiring continuous intermittent communication with the network, may enable the portable power source 304b of the input receptor 300b to last significantly longer than portable power sources of other known remote actuation systems.

The input receptor 300b may further comprise one or more surveillance devices 305b disposed thereon or therein, such as a security camera, a microphone, a proximity sensor, or other known surveillance means. For example, a security camera may be disposed within the interior 306b of the input receptor 300b, with a lens of the camera extending through an exterior 307b of the input receptor 300b. The one or more security devices 305b may continuously gather and transmit information from an environment to a central signal switch as shown in FIG. 2. Additionally, the one or more surveillance devices 305b may trigger the input receptor 300b to exit the low power function when the one or more surveillance devices 305b detect a user.

The input receptor 300b may comprise one or more data connection ports 308b for interacting with firmware of the input receptor 300*b*, such as altering or updating the firmware, running system diagnostics, or managing acceptable inputs and/or input parameters. In some embodiments, such firmware functions may also be performed via a network. The one or more data connection ports 308*b* may be disposed on the interior 306*b* of the input receptor 300*b* to aid in preventing undesired access or accumulation of debris from the surrounding environment. The one or more data connection ports 308*b* may be able to be accessed by detaching a portion of the exterior 307*b* of the input receptor 300*b*.

FIG. 4 shows an interior 406 of an embodiment of a central signal switch 410 with a plurality of components supported by a printed circuit board 409 disposed therein. An actionable device 470, shown as a garage door opener, may be connected to and controlled by the central signal switch 410.

The central signal switch 410 may comprise a microcontroller 411 and an internal memory unit 412 for obtaining and storing one or more acceptable inputs and/or input parameters. The central signal switch 410 may also comprise a communication device 413, such as a radio frequency transceiver, for receiving one or more user inputs from an input receptor (not shown). If at least one of the user inputs received from the input receptor matches one of the acceptable inputs, the central signal switch 410 may send a command to at least one actionable device 470, a network, or a combination thereof, to perform an operation.

In various embodiments, an actionable device may comprise an access control device, such as an electromechanical door lock, a garage door motor, or another access restricting mechanism. Actuation of the access control device may comprise an opening of a door or an engagement or disengagement of a lock. In these embodiments, a user may gain access to a secure area by supplying inputs to an input receptor that match one or more acceptable inputs. In other embodiments, an actionable device may comprise a thermostat, a television, an automated window, automated blinds, a ventilation system, a sprinkler system, a lighting element, an indoor positioning system, or other such devices known in the art. The central signal switch 410 may further comprise a portable power source 404 to provide backup power in case of a power loss.

The central signal switch 410 may further comprise at least one data connection port 408 for interacting with firmware of the central signal switch 410, such as altering or updating the firmware, running system diagnostics, or managing acceptable inputs and/or input parameters. The data connection port 408 may be disposed on an interior 406 of the central signal switch 410, to aid in preventing undesired access or accumulation of debris.

Whereas the present invention has been described in particular relation to the drawings attached hereto, it should be understood that other and further modifications apart from those shown or suggested herein, may be made within the scope and spirit of the present invention.

What is claimed is:

1. A secure remote actuation system, comprising:
    a remote input receptor disposed outside an enclosure comprising:
        a user interface that receives one or more user inputs from a user; and
        a first microcontroller that sends a signal for each input of the one or more user inputs as the user interface receives the input; and
    a central signal switch disposed inside the enclosure and wirelessly connected to the remote input receptor, the central signal switch comprising:
        a memory that stores one or more acceptable inputs; and
        a second microcontroller that obtains a succession of signals from the remote input receptor, the succession of signals corresponding to the one or more user inputs, and compares said one or more user inputs to said one or more acceptable inputs, wherein the second microcontroller obtains each signal in the succession of signals from the remote input receptor as the remote input receiver receives each input from the user.

2. The secure remote actuation system of claim 1, wherein the remote input receptor further comprises one or more communication devices for sending said signal.

3. The secure remote actuation system of claim 2, wherein said one or more communication devices is a radio frequency transceiver.

4. The secure remote actuation system of claim 1, wherein the remote input receptor further comprises a portable power source.

5. The secure remote actuation system of claim 1, wherein the user interface comprises buttons, a visual display, one or more capacitive sensors, a microphone, a vibration recognition module, a proximity sensor, a fingerprint scanner, a retina scanner, a voice recognition module, or a combination thereof.

6. The secure remote actuation system of claim 1, wherein the central signal switch comprises one or more data connection ports.

7. The secure remote actuation system of claim 6, wherein the one or more data connection ports are disposed in an interior of the central signal switch.

8. The secure remote actuation system of claim 1, wherein said memory further stores said one or more user inputs; a history of user inputs; one or more input parameters; or a combination thereof.

9. The secure remote actuation system of claim 1, wherein the remote input receptor executes a low power function after said one or more user inputs is received from the user.

10. The secure remote actuation system of claim 9, wherein the remote input receptor exits said low power function when the user begins to use the user interface.

11. The secure remote actuation system of claim 1, wherein the remote input receptor further comprises a surveillance device to detect a user.

12. The secure remote actuation system of claim 11, wherein the remote input receptor exits a low power function when the surveillance device detects the user.

13. The secure remote actuation system of claim 11, wherein the surveillance device comprises a camera, a microphone, a proximity sensor, or a combination thereof.

14. The secure remote actuation system of claim 1, wherein said cloud-based network comprises a software application for an individual to control said one or more acceptable inputs at said central signal switch.

15. The secure remote actuation system of claim 14, wherein said controlling said one or more acceptable inputs comprises editing, adding, or deleting the one or more acceptable inputs; creating, deleting, or editing one or more input parameters; changing personal settings; conducting diagnoses; and altering or updating firmware.

16. The remote actuation system of claim 1, wherein said remote input receptor comprises one or more data connection ports to interact with firmware of the remote input receptor.

17. The secure remote actuation system of claim 1, wherein said central signal switch is connected to and controls a network of actionable devices.

18. The secure remote actuation system of claim 17, wherein said network of actionable devices comprises access control devices, thermostats, televisions, automated windows, automated blinds, ventilation systems, sprinkler systems, lighting elements, indoor positioning systems, and combinations thereof.

19. The secure remote actuation system of claim 18, wherein said access control devices are electromechanical locking mechanisms.

20. The secure remote actuation system of claim 18, wherein said access control devices secure an enclosed area, room, building, or delivery box.

* * * * *